(12) United States Patent
Nyqvist et al.

(10) Patent No.: US 10,689,130 B2
(45) Date of Patent: Jun. 23, 2020

(54) TRANSPORT ARM FOR TRANSPORTING OBJECTS (71) Applicant: LIFTS ALL AB, Järfälla (SE)

(72) Inventors: Olov Nyqvist, Hässelby (SE); Jimmy Froby, Hässelby (SE)

(73) Assignee: LIFTS ALL AB, Jarfalla (SE)

( * ) Notice: Subject to any disclaimer, the term of this patent is extended or adjusted under 35 U.S.C. 154(b) by 0 days.

(21) Appl. No.: 16/314,028

(22) PCT Filed: Jun. 29, 2017

(86) PCT No.: PCT/EP2017/066155
§ 371 (c)(1),
(2) Date: Dec. 28, 2018

(87) PCT Pub. No.: WO2018/002235
PCT Pub. Date: Jan. 4, 2018

(65) Prior Publication Data
US 2019/0202580 A1    Jul. 4, 2019

(30) Foreign Application Priority Data
Jul. 1, 2016   (EP) .................................... 16177488

(51) Int. Cl.
*B64F 1/36*   (2017.01)
*B25J 9/00*   (2006.01)
(Continued)

(52) U.S. Cl.
CPC ................. *B64F 1/368* (2013.01); *B25J 5/02* (2013.01); *B25J 9/0018* (2013.01); *B25J 9/046* (2013.01)

(58) Field of Classification Search
CPC .. B25J 5/02; B25J 9/046; B25J 9/0018; B64F 1/368
(Continued)

(56) References Cited

U.S. PATENT DOCUMENTS

| 2,861,699 A | 11/1958 | Youmans |
| 6,394,731 B1 * | 5/2002 | Konosu ...................... B25J 5/04 414/5 |

(Continued)

FOREIGN PATENT DOCUMENTS

| EP | 0 841 297 A1 | 5/1998 |
| EP | 2 036 664 A1 | 3/2009 |

(Continued)

OTHER PUBLICATIONS

International Search Report and Written Opinion for corresponding International Application No. PCT/EP2017/066155 dated Sep. 11, 2017.

*Primary Examiner* — Ronald P Jarrett
(74) *Attorney, Agent, or Firm* — Renner, Otto, Boisselle & Sklar, LLP (57) ABSTRACT

A transport arm for transporting objects comprising: an elongate beam coupled to a carriage, a first arm section movable along the elongate beam and a second arm section pivotally attached to the first arm section such that the second arm section an object engagement means for engaging an object to be transported arranged on the second arm section and an operator handle and a drive unit coupled to the first and the second arm section wherein the operator handle comprises a control means which is connected to the drive unit such that an operator by operating the control means may control the drive unit to pivot the second arm section.

15 Claims, 6 Drawing Sheets

(51) Int. Cl.
*B25J 9/04* (2006.01)
*B25J 5/02* (2006.01)

(58) Field of Classification Search
USPC .......................................... 414/680, 681, 689
See application file for complete search history.

(56) References Cited

U.S. PATENT DOCUMENTS

2009/0283490 A1* 11/2009 Givens ....................... B25J 5/04
                                                                                     212/317
2011/0076125 A1* 3/2011 Givens ....................... B25J 5/04
                                                                                    414/751.1

FOREIGN PATENT DOCUMENTS

| EP | 2 655 192 | 6/2012 |
| WO | 2012/087192 A1 | 6/2012 |
| WO | 2014/098568 A1 | 6/2014 |
| WO | 2015/037987 A1 | 3/2015 |

* cited by examiner

TRANSPORT ARM FOR TRANSPORTING OBJECTS

This application is a national phase of International Application No. PCT/EP2017/066155 filed Jun. 29, 2017, and claims priority to European Application No. 16177488.0 filed on Jul. 1, 2016, which is incorporated herein by reference.

TECHNICAL FIELD

The present disclosure relates to a transport arm for transporting objects. In particular the present disclosure relates to a transport arm which is operated manually by a human operator. The transport arm according to the present disclosure is in particular intended for assisting a human operator in moving luggage between a transport conveyor and a freight container in airports or in train- or bus terminals.

BACKGROUND ART

In air freighting, goods or luggage are often loaded in freight containers, so called ULD (Unit Loading Device). Thereby are often various types of transporting aids employed for assisting the airport personnel in loading and unloading goods in the freight containers.

One type of a transporting aid is disclosed in WO2015/037987. This transporting aid comprises a vertical beam which is movable along a conveyor. An arm extends horizontally from the beam and on the end of the arm there is a plate for supporting pieces of luggage that are to be loaded or unloaded from a container. The horizontal arm may be raised or lowered on the vertical beam and also pivoted about the vertical beam to place the support plate in position for loading or unloading luggage.

A drawback with the transporting aid of WO2015/037987 is that the vertical beam occupies space in the loading/unloading area around the container. This limits the room available to the luggage handling personnel for moving around which in turn has a negative impact on the efficiency of the loading/unloading process. The vertical beam may also constitute an obstacle and a collision risk to motorized towing vehicles that operate in the area around the container.

Another type of transporting aid is an industrial robot which may be controlled from a remote location, for example as shown in EP0841297. However, in comparison with manual transporting aids the use of robots suffers from several drawbacks. For example, robot based systems are complex and demands complicated and expensive control equipment. Moreover, it is difficult to control a robot to tightly pack luggage of various size and shape in a freight container.

US20090283490 show a lifting aid that comprises a linkage for lifting object in a straight vertical direction. US20090283490 is not suitable for loading containers that needs to be accessed from the side, such as freight containers.

Thus, it is and object of the present disclosure to provide an improved transport arm for transporting object which solves at least one of the problems in the prior art. In particular it is an object of the present disclosure to provide a flexible transport arm which occupies little space. Moreover, it is an object of the present disclosure to provide a transport arm which may be positioned above a luggage conveyor.

SUMMARY OF THE INVENTION

According to the present disclosure at least one of the above objects is met by a transport arm 1 for transporting objects 6 comprising:
- a carriage 20 configured to be supported in a holder 2 arranged above ground surface 7 and;
- an elongate beam 30 coupled to the carriage 20 and extending along a first horizontal axis (X1);
- a first arm section 40 having a first and a second end 41, 42, wherein the first end 41 is movable along the elongate beam 30 and;
- a second arm section 50 having a first and a second end 51, 52, wherein the first end 51 is pivotally attached to the second end 42 of the first arm section 40 such that the second arm section 50 is pivotal around a second horizontal axis (X2);
- an object engagement means 90 for engaging an object 6 to be transported arranged on the second arm section 50 and comprising a handle 93 for allowing an operator 4 to manually move the first arm section 40 along the elongate beam 30 and;
- a drive unit 70 coupled to the first and the second arm section 40, 50 and arranged to pivot the second arm section 50, wherein the handle 93 comprises a control means 100 which is connected to the drive unit 70 such that an operator by operating the control means 100 may control the drive unit 70 to pivot the second arm section 40.

The transport arm provides several advantages. Firstly, be designing the transport arm to be received in a holder, such as a rail section of a conveyor, above the ground surface the transport arm may be placed out of the way or personnel or vehicles. Moreover, the combination of linear movement of one arm section along the elongate beam and pivotal movement of the other arm section makes the transport arm flexible and facilitates movement of luggage in the narrow area around the luggage belts and freight containers.

In addition, the elongate beam of the transport arm may be rotationally attached to the carriage such that the elongate beam may rotate around a vertical axis Y1, extending through the carriage and the elongate beam. When the transport arm is hanging from a holder in the form of a section of a conveyor rail, this makes it possible to rotate the transport arm into a parking position in which the elongate beam is parallel with the extension of the conveyor such that it does not hinder work on the floor in the area around the conveyor.

DETAILED DESCRIPTION OF EMBODIMENTS

The transport arm according to the present disclosure will now be described more fully hereinafter. The transport arm, which also may be denominated "lifting arm", according to the present disclosure may however be embodied in many different forms and should not be construed as limited to the embodiments set forth herein. Rather, these embodiments are provided by way of example so that this disclosure will be thorough and complete, and will fully convey the scope of the present disclosure to those persons skilled in the art. Same reference numbers refer to same elements throughout the description.

Figure 1:
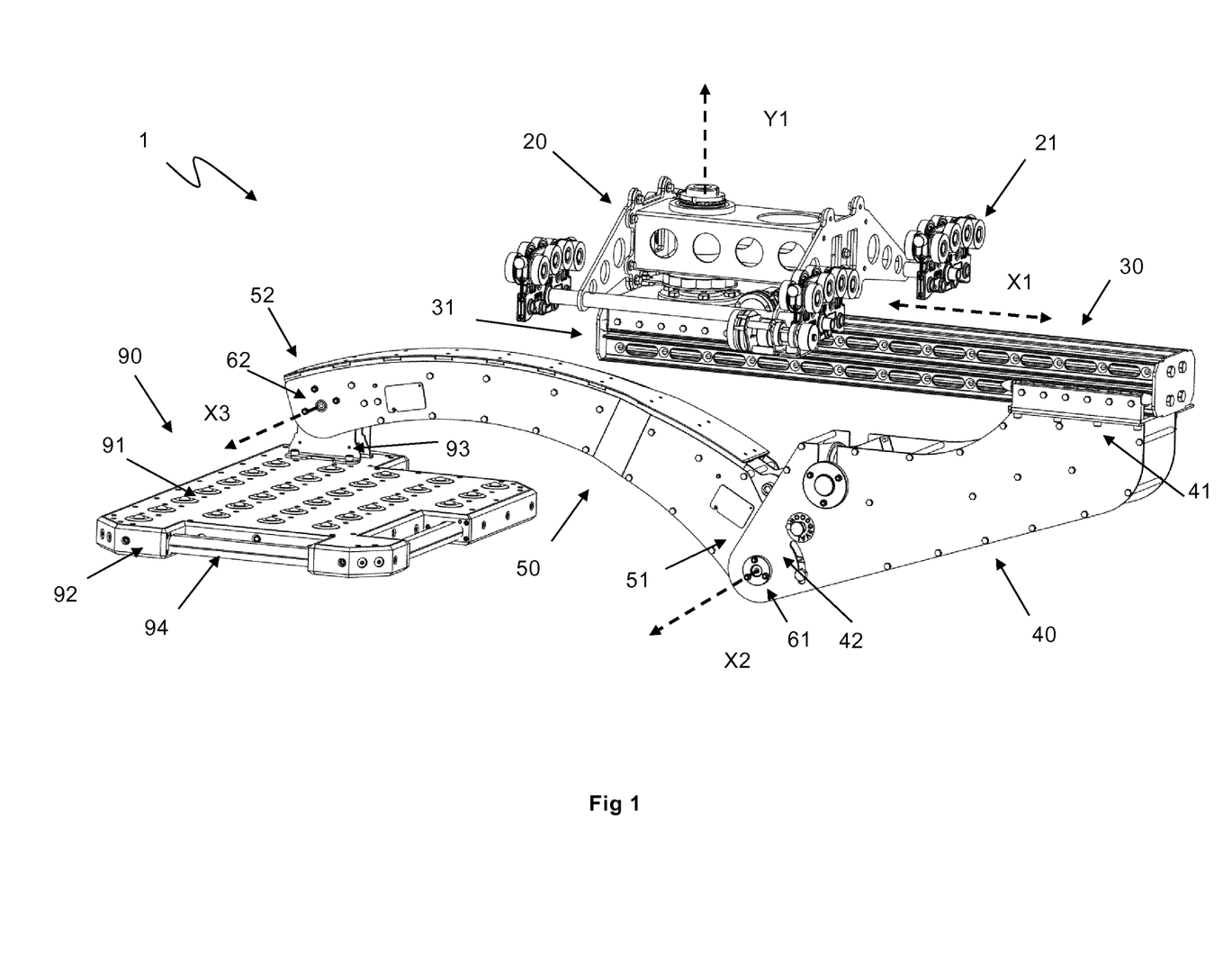
FIG. 1: A schematic drawing of a transport arm according to a first preferred embodiment of the present disclosure in a first position.

FIG. 1 shows a transport arm 1 according to a first preferred embodiment of the present disclosure. The transport arm 1 according to the described embodiment is principally intended for assisting a human operator to manually move luggage, for example bags, suitcases or boxes or the like between a luggage belt and a freight container.

The transport arm 1 comprises a carriage 20 which is configured to be received in a holder (not shown) which is arranged above the ground surface. In the described embodiment, the carriage 20 is configured to be received in a holder (not shown) in the form of a rail section of a transport arm conveyor. Preferably, the carriage 20 is movable along the transport arm conveyor rail. Apart from a conveyor rail section, the holder may also be any type of support for suspending the transport arm above ground surface. For example a bracket or a fixed beam.

Figure 3:
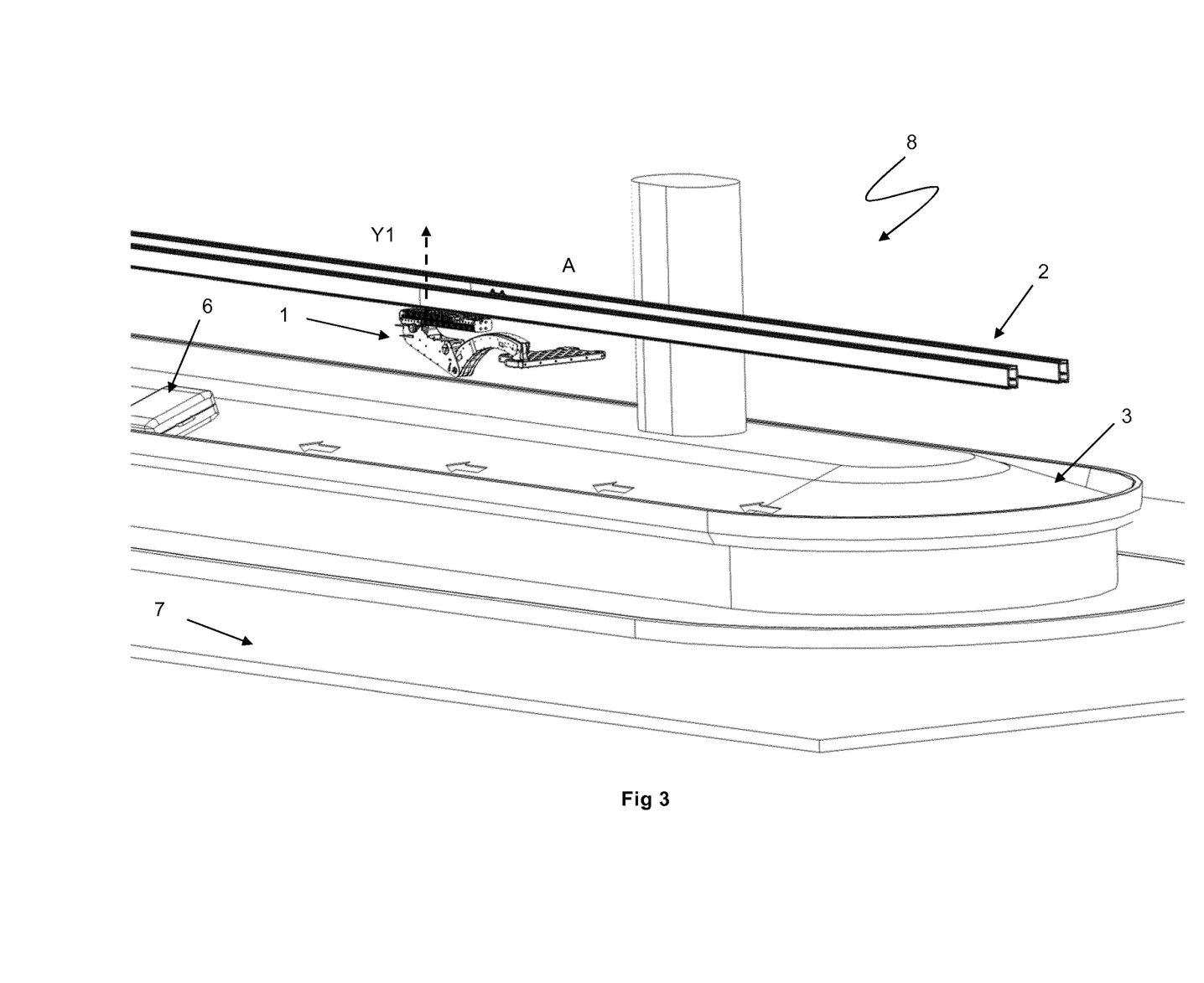
FIG. 3: A schematic drawing of a transport arrangement comprising a transport arm according to the present disclosure.

The carriage 20 may comprise engagement means 21 in the form of rollers to enable the carriage 20 to move along the holder. When the carriage 20 is received in the holder, the carriage 20 and the holder are oriented along a vertical axis Y1. FIG. 3 shows a transport system 8 comprising a transport arm 1 which is received in a holder 2 in the form of a rail section of a transport arm conveyor rail which is suspended above the ground surface 7. The transport arm conveyor 2 is thereby suspended above an object conveyor 3 in the form of a luggage belt onto which an object 6 in the form of a piece of luggage is transported. The transport arm conveyor 2 is an elongate rail having two parallel rail members each of rectangular cross-section and provided with a slot that extends on the lower side over the length of the profiles. The carriage 20 (not shown in FIG. 3) of the transport arm 1 is received within the rectangular cross-section of the conveyor profiles 3 such that the transport arm 1 hangs from the conveyor 3 and may be moved along the conveyor. A releasable brake (not shown), such as an electromagnetic brake may be provided on the carriage 20 in order to lock the carriage 20 to the holder 2.

Returning to FIG. 1, the transport arm 1 further comprises an elongate beam 30. The first end 31 of the beam 30 is coupled to the carriage 20 such that the beam 30 may rotate around the first vertical axis Y1 which extends through the carriage 20 and the first end 31 of the beam 30. The elongate beam extends, with reference to the carrier 20, along a first horizontal axis X1. That is, when the transport arm is hanging from a conveyor rail section (as shown in FIG. 3) the elongate beam 30 and the carrier 20 are oriented along the first vertical axis Y1 and the beam 30 extends along the first horizontal axis X1. The transport arm 1 may comprise means to lock the elongate beam 30 in different rotational positions. For example, the elongate beam may rotated to a parking position as shown in FIG. 3, in which the beam extends parallel with the conveyor. The beam 30 may further be movable attached to carriage 20 such that the elongate beam 30 may be moved in relation to the carriage 20 in direction of the first horizontal axis X1. For example the carriage 20 comprises engagement means (not shown) such as rollers or gliding blocks for movable attaching the beam 30 to the carriage. A releasable brake (not shown), such as an electromagnetic brake may also be provided on the carriage 20 in order to lock the beam 30 to the carriage 20.

The transport arm 1 further comprises a first arm section 40 which has a first end 41 and a second end 42. The first end 41 of the first arm section 40 is movably attached to the elongate beam 30 such that the first arm section 40 may be moved manually by a human operator along the elongate beam 30. For example, the first end 41 of the first arm section 40 may comprise engagement means (not shown) such as rollers or gliding blocks for movable attaching the first arm section 40 to the beam 30. It is appreciated that the first arm section 40 also is oriented parallel with the first vertical axis Y1. That is the carriage 20 is arranged above the elongate beam 30 and the first arm section 41 is arranged below the elongate beam 30. A releasable brake (not shown), such as an electromagnetic brake may also be provided in the first arm section 40 in order to lock the first arm section 40 to the beam 30.

The first arm section 40 is a rigid arm section in one single piece. Thus, the first end 41 of the first arm section 40 is movably attached directly the elongate beam 30 via engagement means for movable attaching the first arm section 40 to the elongate beam 30.

The transport arm 1 further comprises a second arm section 50 which has a first end 51 and a second end 52. The second arm 50 is elongate and curved, i.e. it has a radius. The first end 51 of the second arm section 50 is pivotally attached to the second end 42 of the first arm section 40. The second arm section 50 is thereby pivotal relative the first arm section 40 around a second horizontal axis X2. In the embodiment shown in FIG. 1 the second horizontal axis X2 is orthogonal to the first horizontal axis X1. The second arm section 50 is pivotally attached to the first arm section 40 by a first pivot shaft 61 which is fixed in the second end 41 of the first arm section and extends through the first end 51 of the second arm section 50.

In detail, the second arm section 50 is a rigid arm section in one single piece. The first end 51 of the second arm section 50 is pivotally attached, e.g. by first pivot shaft 61, directly to the second end 42 of the first arm section 40. This allows entire second arm section 50, including the second end 52 to move, i.e. pivot along an arc-shaped curve in vertical direction. Vertical direction may be defined as a direction parallel with the vertical axis Y1 or movement towards or away from the horizontal axis X1. By "arc-shaped curve" is meant a section of the periphery of an imaginary circle having a radius formed by the second arm section 50.

The transport arm 1 further comprises an object engagement means 90 which is pivotally attached to the second end 52 of the second arm section 50. In the embodiment shown in FIG. 1, the object engagement means 90 is a flat element, e.g. a plate and comprises an upper, planar surface 91 onto which an object may be placed. Typically the object is a piece of luggage. However, it is appreciated the object engagement also could be a hook, a grip claw or an electromagnet or the like. An attachment 93 extends perpendicular from the upper surface of 91 of the object engagement means 90. The attachment 93 is pivotally attached to the second end 52 of the second arm section 50 such that the object engagement means 90 may pivot relative the second end 52 of the second arm section 50 around a third horizontal axis X3. The object engagement means 90 is thereby pivotally attached to the second arm section 50 by a second pivot shaft 62 which extends through the attachment 93 of the object engagement means 90 and through the second end 52 of the second arm section 50. The second pivot shaft 62 is firmly fixed in the attachment 93 of the load engagement means 90 and rotationally attached in the second end 52 of the second arm section 50. In the embodiment shown is FIG. 1, the first and second pivotal shafts are parallel and therefore the third horizontal axis X3 is parallel with the second horizontal axis X2 and orthogonal to the first horizontal axis X1.

Thus, in detail, the object engagement means 90 is attached directly to the second end 52 of the second arm 50. Preferably, the object engagement means 90 is pivotally attached directly to the second end 52 of the second arm 50. The second arm section and the object engagement means 90 are therefore movable, i.e. pivotal in vertical direction along an arc shaped curve.

By "pivotally attached directly" is hereinabove meant the apart from the pivot shafts 61, 62 there are no other linkages between the second arm section 50 and the first arm section 40 and between the second arm section and the object engagement means 90.

The object engagement means 90 further comprises an operator handle 94 which is configured to be gripped by one or both hands of a human operator. One purpose of the operator handle 94 is to allow a human operator to grip hold of the object engagement means 90 and manually move the first arm section 40 along the elongate beam 30. The human operator may thereby apply a pushing or pulling force onto the object engagement means 90 which in turn causes the first arm section 40 to move along the elongate beam 30. In the embodiment described in FIG. 1, the operator handle 94 is rod shaped, i.e. elongate, and extends parallel with the side 92 of the object engagement means and along at least a portion of the side 92 of the object engagement means 90. However, it is appreciated that the object engagement means 90 may comprises two or three or further operators handles. It is also appreciated that the operators handle may extend around the load engagement means. Moreover, the operator handle may alternatively be of other form, such as knobs or joystick shaped handles. Alternatively, the operator handle 94 may be arranged such that it protrudes from the support surface 91 of the object engagement means 90.

Figure 2:
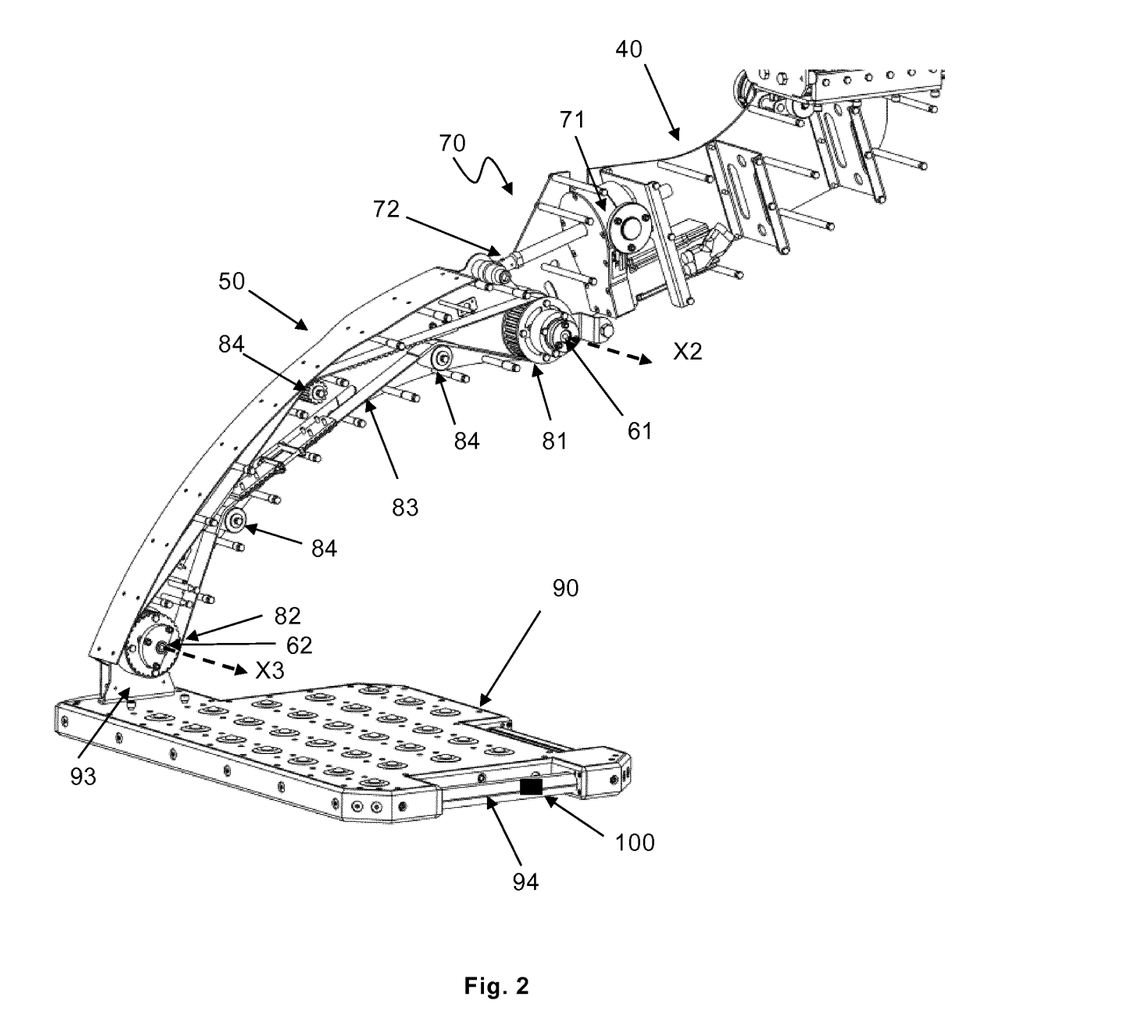
FIG. 2: A schematic drawing of a portion of the transport arm according to the present disclosure in cross-section.

FIG. 2 shows a cross-sectional view of the first and the second arm section 40, 50. Also shown is the object engagement means 90. A drive unit 70 is coupled to the first arm section 40 and to the second arm section 50 and configured to pivot the second arm section 50 around the second vertical axis X2. In the embodiment shown in FIG. 2, the drive unit 70 comprises a motor 71, which is arranged in the first arm section 40 and an actuator 72, i.e. a linear actuator, which is attached to the second arm section 50. The motor 71 and the actuator 72 are thereby arranged such that when the motor 71 is run in one direction the actuator 72 is moved towards the second arm section 50 and when the motor 71 is run in the other direction, the actuator 72 is moved towards the first arm section 40. That is, when the motor is run in one direction, the second arm section 50 is pivoted in clockwise direction around the first horizontal axis X1 and when the motor is run in the other direction the second arm section 50 is pivoted in counter clockwise direction. The motor 71 may for example be an electrical motor and the actuator 72 may be a ball screw actuator. However, it is possible to realize the drive unit in the form of a hydraulic or pneumatic cylinder/piston arrangement. It is also possible to arrange the motor 70 in the second arm section 50 and couple the actuator 70 to the first arm section 40.

To allow the operator of the transport arm 1 to control the drive unit 70 and thereby the pivotal movement of the second arm section 50, the operator handle 94 is provided with a control means 100. The control means 100 is configured such that the operator of the transport arm 1 simultaneously may manipulate the control means 100 with the hand while holding the operators handle 94. This allows the operator of the transport arm 1 to simultaneously move the first arm section 40 along the elongate beam 30 and to pivot the second arm section 50 in relation to the first arm section 40. Typically, the control means 100 is electrically connected to the drive unit 70 and displaceable, by the hand of the operator, in a first direction and a second direction. The drive unit 70 is thereby configured to pivot the second arm 50 in one direction around the second horizontal axis X2 when the control means 100 is displaced in the first direction and to pivot the second arm 50 in opposite direction around the second horizontal axis X2 when the control means 100 is displaced in the second direction. The control means 100 may be realized in many forms, for example the control means may be a slide which is slidable displaceable in a first and a second direction or a tunable knob or a wheel which may be rotated in clockwise/counter-clockwise direction. The control means 100 may thereby be configured to output an electrical signal, such as a voltage, in dependency of the degree displacement of the control means. That is the degree of turning or sliding. The outputted electrical signal is used to control the drive unit. For example the control means may be based on potentiometer or Hall-Effect techniques.

According to a preferred embodiment the control means 100 is a proportional output thumbwheel of the type HR1504-A-R1 which is commercially available from the company APEM. This type of control means 100 comprises a Hall Effect sensor coupled to a thumb wheel. Such control means provides an accurate output signal for controlling the drive unit of the transport arm and are not subject to wear.

The control means 100 may be connected to the drive unit 70 via a control unit (not shown), such as a frequency converter or a Programmable Logic Controller (PLC), which are configured to control the drive unit 95 in dependency of the signals from the control means 100.

FIG. 2 shows a further feature of the transport arm 1 according to the present disclosure. A first cog wheel 81 is arranged concentrically with the first pivot shaft 61 and fixed thereto. As described earlier, the first pivot shaft 61 is fixed in the second end 52 of the first arm section 50. A second cog wheel 82 is arranged concentrically with the second pivot shaft 62, which is fixed to the attachment 93 of the object engagement means 90. A toothed drive belt 83, is arranged around the first cog wheel 81 and the second cog wheel 82. Auxiliary guide wheels 84 are also provided to guide the drive belt 83 within the curved second arm section 50.

In operation, the object engagement means 90 is oriented such that its support surface 91 is horizontally aligned, i.e. parallel with the first horizontal axis X1. The toothed drive belt 83 is then placed around the first and the second cog wheels 81, 82 and connects thereby the position of the second cog wheel 82 with the position of the first cog wheel 81. Therefore, when the second arm section 50 is pivoted, the toothed drive belt 83 moves over the first cog wheel 81 and rotates thereby the second cog wheel 82. The rotational movement of the second cog wheel 82 causes the second pivot shaft 62 to rotate in opposite direction with regards to the pivotal movement of the second arm section 40. This in turn results in that the object engagement means 90 also is pivoted and held in the predefined horizontal position.

A preferred embodiment of an operator handle 94 having a control means 100 will in the following be described with reference to FIGS. 4 and 5.

Figure 4:
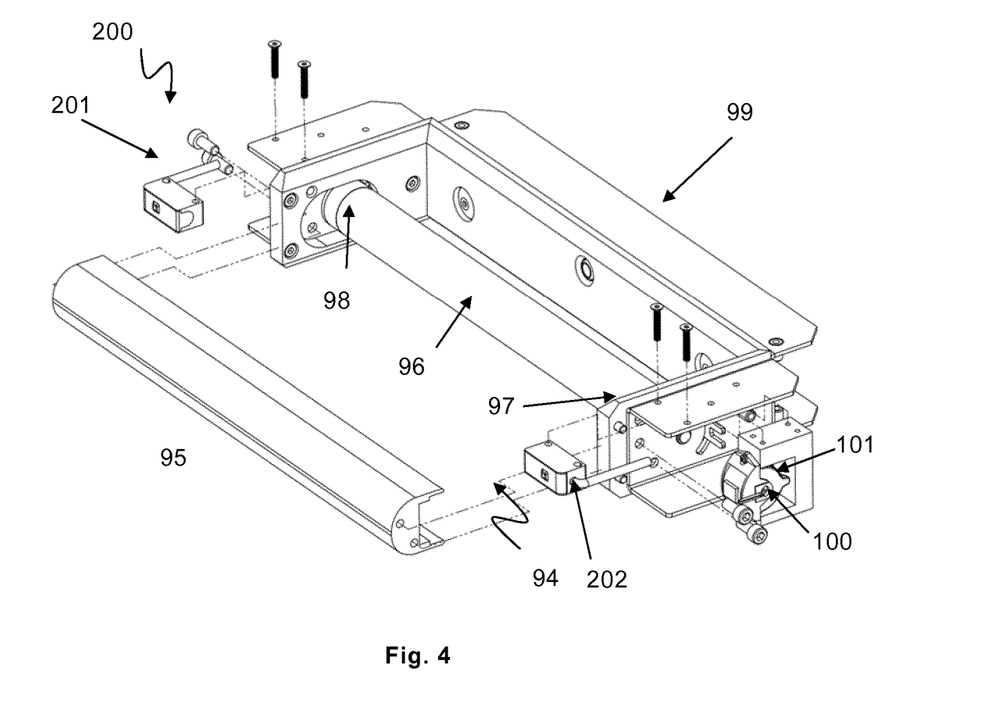
FIG. 4, 5: Schematic drawings of the handle of the transport arm according to the preferred embodiment.
Figure 5:
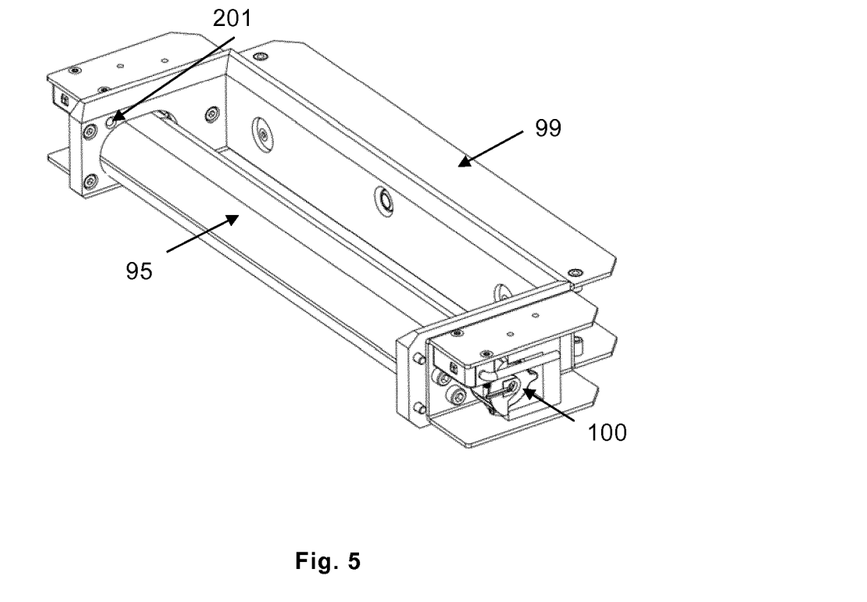

FIG. 4 shows an exploded view of an operator handle 94 and a module casing 99 for the operators handle 94. FIG. 5 shows the operator handle 94 mounted in the module casing 99. In the described embodiment, the module casing 99, together with the operator handle 94, is configured to be mounted in a corresponding recess in the object support means 90, see FIG. 1. This is advantageous, since it facilitates replacement of a worn out handle. However, the operator handle 94 according to the described embodiment may also be directly arranged in the object support means 90.

The operator handle 94 comprises an elongate cylindrical portion 96, which for example may be a rod or a tube. The opposite ends 97, 98 of the cylindrical portion 96 are rotationally attached to the module casing 99. One end 97 of the cylindrical portion 96 is in engagement with a control means 100 which is in the form of the aforementioned proportional output thumbwheel and comprises a rotational wheel 101. Therefore, when in engagement, the cylindrical portion 96 and the thumb wheel 101 may rotate around a common longitudinal axis extending through the center of wheel 101 and through the opposite ends 97, 98 of the cylindrical portion 96. The handle 94 further comprises a hand support section 95 which is elongate and of semi-circular hollow cross-section. The hand support section 95 is fixedly attached to the module casing 99 such that the cylindrical portion 96 is partially received within the hand support section 95. In operation the operator may hold the hand support section 95 and use his fingers to rotate the cylindrical portion 96 with high accuracy. The rotational movement of the rotational portion 96 is transferred to the wheel 101 of the control means 100 which controls the drive unit 70 to pivot the second arm section 50. As described earlier, the drive unit of the transport arm may be configured to pivot the second arm section 50 in opposite direction in dependency of the rotational position of the rotational portion 96 of the operators handle 94.

An advantage of the fixed hand support section 95 is that it provides a clear reference for the hand of the operator when the second arm section 50 is pivoted. Thereby is avoided that a sudden raise of the object engagement means 90 during pivoting of the second arm section 50 would result in that the operator involuntarily increases turning of the cylindrical portion 96. The operator handle 94 according to the described embodiment thereby provides increased control over the pivotal movement of the transport arm 1 and increased safety for the operator of the transport arm.

To increase safety, a photoelectric sensor 200 may be arranged to detect the presence of a hand on the operators handle. The photoelectric sensor typically comprise a light source 201 arranged in one end 97 of the operator handle 90 and light sensor 202 arranged in the other end 98 of the operator handle. For example the photoelectric sensor 200 is a BY500-TDT or a BYS500-TDT commercially available from the company Autonics.

The photoelectric sensor 200 may be connected in a so called "deadman control" to the releasable brakes in the carriage 20 and to the releasable brake in the first arm section 40. Thus, when the operator grips the operators handle, the light beam between the light source 201 and the light sensor 202 is interrupted and the releasable brakes are released such that the transport arm may be moved. When the operator let go of the operator handle the releasable brakes are locked.

The function of the transport arm 1 according to the present disclosure will in the following be described with reference to FIGS. 6a-6d.

Figure 6A:
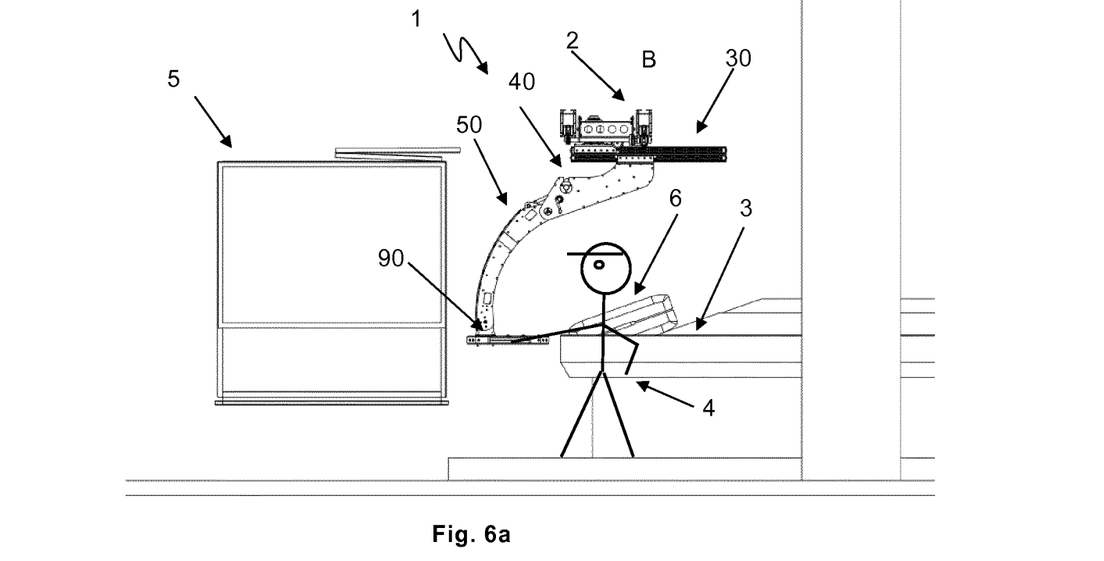
FIG. 6a-d: Schematic drawings of the transport arm according to the present disclosure in luggage loading operation.

FIG. 6a shows the transport arm 1 in transporting position B and hanging from a conveyor rail 2 which is suspended over a luggage transport belt 3. Also shown is a piece of luggage 6 on the transport belt 3 and a container 5 in the form of a ULD (Unit Loading Device) for air-freight. A human operator 4 is operating the transport arm 1 and grips by hand the handle (not shown) of the object engagement means 90. The operator 4 has moved the transport arm 1 into position for placing the luggage 6 onto the object engagement means 90. The operator 4 has thereby, by hand, manually moved the first arm section 40 along the elongate beam 30. The operator 4 has also operated the control means on the handle (not shown) of the load engagement means 90 to control the drive unit (not shown) to pivot the second arm section 50 downwards. FIG. 6a also illustrates the advantage of designing the second arm section 50 with a radius. Namely, the radius provides a large clearance between the second arm section 50 and the luggage 6 on the transport belt 3. The object engagement means 90 may thereby be placed close to the luggage belt 3 without that the second arm section 50 blocks luggage 6 which is transported on the luggage belt.

Figure 6B:
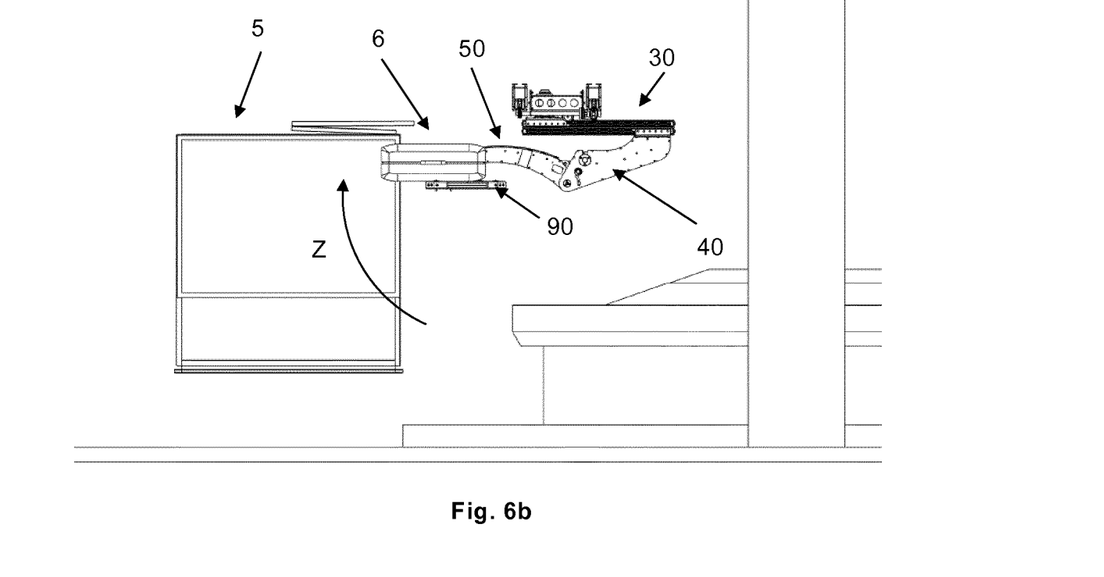

In FIG. 6b the human operator (not shown) has placed the luggage 6 on the load engagement means 90 and operated the control means of the operator handle to control the drive unit (not shown) to pivot the second arm section 50 upwards. The second arm section is thereby pivoted along an arc-like curve as indicated by arrow Z. To stay clear of the container 5, the operator has simultaneously pushed the first arm section 40 along the elongate beam 30 in direction away from the container 5.

Figure 6C:
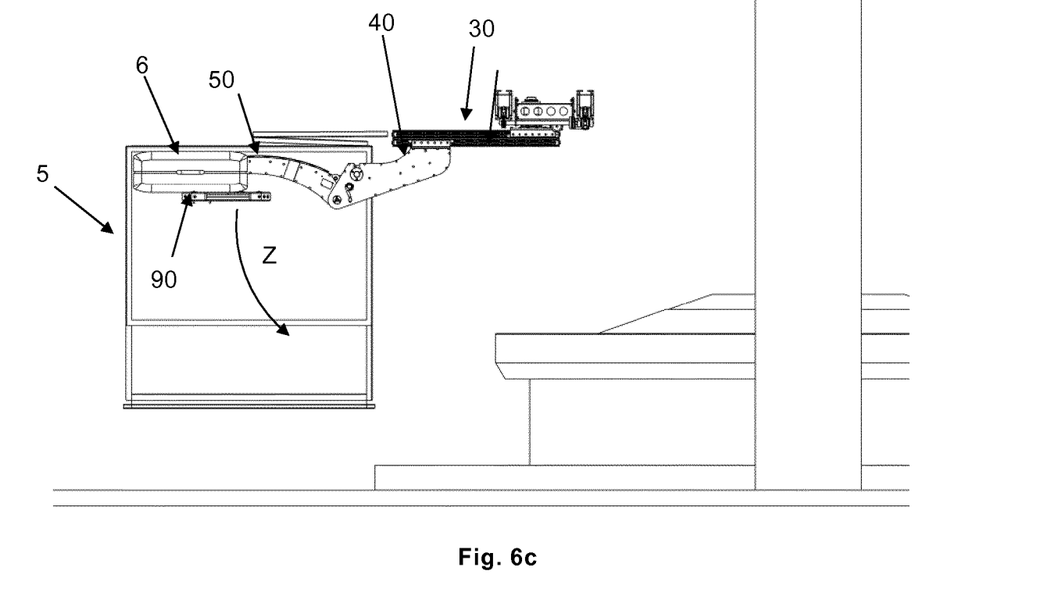

In FIG. 6c, the human operator (not shown) has pushed the first arm section 40 along the elongate beam 30 in direction towards the container 5 such that the second arm section 50 and the luggage 6 on the object engagement means 90 has entered into the container 5. In this position, the operator operates the control means to pivot the second arm section 50 downwards along an arc-like curve indicated by arrow Z.

Figure 6D:
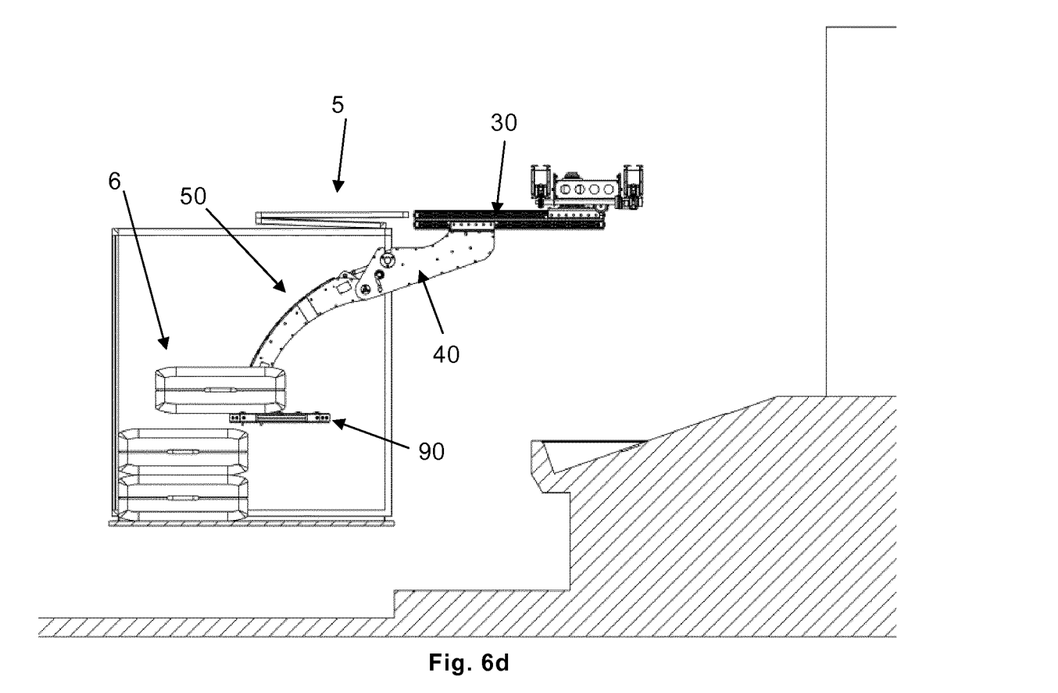

In FIG. 6d, the human operator (not shown) has operated the control means of the operators handle to control the drive unit (not shown) to pivot the second arm section 50 downwards in order to manually place the luggage 6 on top of other luggage in the container 5. To place the object engagement means 90 in an optimal position for manually unloading the luggage 6, the operator has moved the first arm section 40 a small distance along the elongate beam 30 in direction away from the container 5.

The invention claimed is:

1. A transport arm for transporting objects comprising:
   a carriage configured to be supported in a holder arranged above ground surface and;
   an elongate beam coupled to the carriage and extending along a first horizontal axis, wherein the elongate beam is moveable in relation to the carriage in the direction of the first horizontal axis;
   a first arm section having a first and a second end, wherein the first end is movable along the elongate beam and;
   a second arm section having a first and a second end, wherein the first end is pivotally attached to the second end of the first arm section such that the second arm section is pivotal around a second horizontal axis;
   an object engagement means for engaging an object to be transported arranged on the second arm section and comprising an operator handle for allowing an operator to manually move the first arm section along the elongate beam and;

a drive unit coupled to the first and the second arm section and arranged to pivot the second arm section in relation to the first arm section, wherein the operator handle comprises a control means which is connected to the drive unit such that an operator by operating the control means may control the drive unit to pivot the second arm section.

2. The transport arm according to claim 1, wherein the second arm section and the object engagement means are arranged such that the second arm section and the object engagement means may be pivoted along an arc-shaped curve.

3. The transport arm according to claim 1, wherein the first arm section is a rigid arm section and the second arm section is a rigid arm section and wherein the first end of second arm section is pivotally attached directly to the second end of the first arm section and wherein the object engagement means is attached directly to the second end of the second arm section.

4. The transport arm according to claim 1, wherein the drive unit comprises a linear actuator and a motor, wherein the motor is arranged in one of the first and the second arm section and wherein the linear actuator is coupled to the other of the first and the second arm section.

5. The transport arm according to claim 1, wherein the control means is configured to be displaced in a first direction and a second direction, wherein the drive unit is configured to pivot the second arm in one direction around the second horizontal axis when the control means displaced in the first direction and to pivot the second arm in opposite direction around the second horizontal axis when the control means displaced in the second direction.

6. The transport arm according to claim 1, wherein the control means is a wheel which configured to be turned in clockwise direction and counter-clockwise direction.

7. The transport arm according to claim 1, wherein the control means is configured to output an electrical signal when operated.

8. The transport arm according to claim 1, wherein the object engagement means has a side, wherein the operator handle comprises:
an elongate cylindrical portion having first and second ends which are rotationally attached in the side of the object engagement means such that the elongate cylindrical portion extends parallel with the side of the of the object engagement means and;
a control means comprising a wheel which is coupled to the first or the second end of the elongate cylindrical portion such that rotation of the cylindrical portion causes rotation of the wheel and;
an elongate hand support section which is fixed in the side of the object support means and that extends parallel with the side of the object support means and arranged such that an operator may hold the hand support section and rotate the cylindrical portion.

9. The transport arm according to claim 1, wherein the second arm section is pivotally attached to the first arm section by a first pivot shaft and wherein the object engagement means is pivotally attached to the second end of the second arm section by a second pivot shaft.

10. The transport arm according to claim 9, wherein a first cog wheel is arranged concentrically with the first pivot shaft and a second cog wheel is arranged concentrically with the second pivot shaft and wherein a toothed drive belt is arranged around the first and the second cog wheels.

11. The transport arm according to claim 1, wherein the transport arm is configured for transporting objects in the form of luggage between a luggage transport conveyor and a luggage container.

12. The transport arm according to claim 1, wherein the object engagement means comprises a plane support surface for supporting an object to be transported.

13. The transport arm according to claim 1, wherein the holder is at least a section of a transport arm conveyor rail.

14. The transport arm according to claim 13, wherein the elongate beam is rotationally coupled to the carriage such that the elongate beam is movable around an vertical axis between a parking position in which the elongate beam extends parallel to the transport arm conveyor and a transporting position in which the elongate beam extends in direction away from the transport arm conveyor.

15. A luggage handling system comprising:
a transport arm conveyor arranged above ground surface;
a luggage transport conveyer arranged below the transport arm conveyor and;
at least one transport arm according to claim 1.

* * * * *